(12) United States Patent
Cheng et al.

(10) Patent No.: US 8,409,465 B1
(45) Date of Patent: Apr. 2, 2013

(54) DEICING SALT COMPOSITION AND METHOD FOR PREPARING THE SAME

(75) Inventors: Xinchuan Cheng, Huanggang (CN); Zhijun Xu, Huanggang (CN); Shengli Wen, Huanggang (CN); Lu Feng, Huanggang (CN)

(73) Assignee: Hubei Ruifuyang Chemical Technology Co., Ltd., Huanggang (CN)

( * ) Notice: Subject to any disclaimer, the term of this patent is extended or adjusted under 35 U.S.C. 154(b) by 0 days.

(21) Appl. No.: 13/586,894

(22) Filed: Aug. 16, 2012

Related U.S. Application Data

(63) Continuation-in-part of application No. PCT/CN2011/081957, filed on Nov. 8, 2011.

(30) Foreign Application Priority Data

Sep. 9, 2011 (CN) .......................... 2011 1 0270365

(51) Int. Cl.
 *C09K 3/18* (2006.01)
(52) U.S. Cl. ........................................... 252/70; 106/13
(58) Field of Classification Search .................... 252/70; 106/13
See application file for complete search history.

(56) References Cited

U.S. PATENT DOCUMENTS

| | | | | |
|---|---|---|---|---|
| 6,059,989 | A | * | 5/2000 | Stankowiak et al. ........... 252/70 |
| 6,149,833 | A | * | 11/2000 | Dietl et al. ........................ 252/70 |
| 6,673,261 | B1 | * | 1/2004 | Gurkaynak et al. ............. 252/70 |
| 7,314,577 | B2 | * | 1/2008 | Koefod ............................ 252/70 |
| 7,628,934 | B2 | * | 12/2009 | Hietala ............................ 252/70 |
| 7,655,153 | B2 | * | 2/2010 | Koefod ............................ 252/70 |
| 7,943,057 | B2 | * | 5/2011 | Stokes et al. .................... 252/70 |
| 2009/0250654 | A1 | * | 10/2009 | Lievens et al. .................. 252/75 |

FOREIGN PATENT DOCUMENTS

WO  WO2005/023957 A1 *  3/2005

\* cited by examiner

*Primary Examiner* — Anthony J Green
(74) *Attorney, Agent, or Firm* — Matthias Scholl P.C.; Mathias Scholl

(57) ABSTRACT

A deicing salt composition, including: between 95 and 98 wt. % of a formate, between 1 and 3.5 wt. % of a silicate, between 0.05 and 0.5 wt. % of sodium metaaluminate, between 0.1 and 1 wt. % of sodium carbonate, and between 0.05 and 0.5 wt. % of a organophosphate containing a phosphoryl group. The formate is selected from the group consisting of sodium formate, potassium formate, or a mixture thereof. The silicate is selected from the group consisting of sodium disilicate, potassium disilicate, sodium metasilicate, potassium metasilicate, or a mixture thereof. The organophosphate containing the phosphoryl groups is selected from the group consisting of hydroxy ethyl disodium diphosphate, 2-phosphate butane-1, 2,4-tricarboxylic acid tetrasodium, α-hydroxyphosphorus sodium acetate, or a mixture thereof.

4 Claims, No Drawings

DEICING SALT COMPOSITION AND METHOD FOR PREPARING THE SAME

CROSS-REFERENCE TO RELATED APPLICATIONS

This application is a continuation-in-part of International Patent Application No. PCT/CN2011/081957 with an international filing date of Nov. 8, 2011, designating the United States, now pending, and further claims priority benefits to Chinese Patent Application No. 201110270365.2 filed Sep. 9, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a deicing salt composition, and more particularly to an ecological deicing salt composition comprising formate as the main ingredient.

2. Description of the Related Art

Conventional chlorine deicers contain chlorine ions and thus are corrosive. Although rust inhibitors (slushing compounds) are always added into chlorine deicers to reduce the corrosiveness on metals and road construction materials, the corrosiveness is still prominent. Furthermore, chlorine ions have an impact on soils and vegetations, and do harm to the growth of plants. Biological deicers made from grain crops, waste water originated from paper-making, wine by-products, and lipolysaccharide products have low cost and no environmental pollution, however, the deicing effect is not so good. Urea deicers are apt to degrade into ammonia, and calcium nitrate and magnesium nitrate deicing salt contain nitrate radical, both of which may result in eutrophication. Alcohol deicing salts containing glycol or glycerin have a high COD (Chemical Oxygen Demand) value.

Formate salts are new organic deicing salts, with fast and effective deicing ability, easy degradation, low oxygen demand, and little impact on the environment. Thus, it is a mild deicing salt friendly to ecology and the environment. However, formate has certain corrosive effect on metals, particularly on light metals, and thus, rust inhibitors must be added to compromise the corrosiveness. In the prior art, inorganic phosphates are generally employed as rust inhibitors, which, however, will react with calcium ions in the water to form calcium carbonate. Thus, a scale inhibitor is needed. Furthermore, inorganic phosphates in the water stimulate the growth of algae and thus result in water eutrophication.

SUMMARY OF THE INVENTION

In view of the above-described problems, it is one objective of the invention to provide a deicing salt, which has a fast and effective deicing ability, low corrosiveness, and easy degradation.

To achieve the above objectives, in accordance with one embodiment of the invention, there is provided a deicing salt comprising between 95 and 98 wt. % of a formate, between 1 and 3.5 wt. % of a silicate, between 0.05 and 0.5 wt. % of sodium metaaluminate, between 0.1 and 1 wt. % of sodium carbonate, and between 0.05 and 0.5 wt. % of a organophosphate containing a phosphoryl group. The formate is selected from the group consisting of sodium formate, potassium formate, or a mixture thereof; the silicate is selected from the group consisting of sodium disilicate, potassium disilicate, sodium metasilicate, potassium metasilicate, or a mixture thereof; the organophosphate containing phosphoryl groups is selected from the group consisting of hydroxy ethyl disodium diphosphate ($HEDPNa_2$), 2-phosphate butane-1, 2,4-tricarboxylic acid tetrasodium ($PBTCANa_4$), α-hydroxy-phosphorus sodium acetate (HPAANa), or a mixture thereof.

In a class of this embodiment, a modulus of the silicate is between 1 and 3.5.

In accordance with another embodiment of the invention, there is provided a method of preparation of the deicing salt, comprising: grinding, mixing, stirring, and squeezing the formate, the silicate, the sodium metaaluminate, the sodium carbonate, and the organophosphate containing the phosphoryl group, to yield particles with diameters of between 2 and 6 mm, and drying the particles.

Advantages of the invention are summarized below:

1) the deicing salt has a potent deicing ability;
2) the organophosphate containing the phosphoryl group [—$PO(OH)_2$] mixed with the silicate acts as an anti-corrosive agent, and a small amount of sodium metaaluminate and sodium carbonate are added, which improves the anti-corrosiveness of the anti-corrosive agent on the magnalium alloy, and the deicing salt has low corrosiveness on carbon steel and concrete; in particular, the deicing salt has such a low corrosiveness on magnalium alloy materials and aluminum alloy materials in airplanes that it meets the standard of environmental requirements to aerial materials in SAE-AMS-1431C of America;
3) the deicing salt can be biodegradable easily, and the biochemical oxygen demand (BOD) and the chemical oxygen demand during the biodegradation are very low, thus it has a good performance of environmental protection; and
4) the deicing salt has the ability of fast dissolution and high solubility at low temperature, and the particles of the deicing salt have strong hydroscopicity, they can rapidly absorb the water from the ambient air to form salt water at low temperature, penetrate into the earth surface, and spread outward to destroy the adhesion between the ice/snow and the freezing earth, to achieve the objective of deicing fast and effectively.

DETAILED DESCRIPTION OF THE EMBODIMENTS

To further illustrate the invention, experiments detailing a deicing salt and a method for preparing the same are described below. It should be noted that the following examples are intended to describe and not to limit the invention.

Examples 1-4

Components of deicing salts of 4 examples of the invention are given below in Table 1 (data hereinbelow mean weight percents of each component in the total of a deicing salt):

TABLE 1

Components of deicing salts of Examples 1-4

| Component | Example 1 | Example 2 | Example 3 | Example 4 |
|---|---|---|---|---|
| Sodium formate | 96 | 98 | 97.5 | 97.2 |
| Sodium carbonate | 0.5 | 0.2 | 0.5 | 0.3 |
| Sodium disilicate | 3.25 | 1.58 | 1.75 | 2.3 |
| Sodium metaaluminate | 0.1 | 0.1 | 0.1 | 0.1 |
| HEDPNa$_2$ | 0.15 | 0 | 0 | 0 |
| PBTCANa$_4$ | 0 | 0.12 | 0.15 | 0 |
| HPAANa | 0 | 0 | 0 | 0.1 |

The modulus of silicate is 2.

A method for preparing the deicing salts of Examples 1-4 is given below: each component was collected by weight percent, ground, mixed, and stirred uniformly, then the resulting mixture was squeezed into particles between 2 and 6 mm in diameter, and finally oven-dried to yield the deicing salts.

Example 5

Test of Deicing Ability of Deicing Salts of Examples 1-4

In accordance with GB/T23851-2009 (Road deicing agent), deicing ability of the deicing salts of Examples 1-4 has been tested, and the testing method was as follows:

100 mL of water was added into a ceramic crucible, which was then put in a low-temperature calorstat at a temperature of −10° C. After the water was frozen into ice, the ceramic crucible was taken out. Then the water and the ice on the outer surface of the ceramic crucible were wiped away, and the ceramic crucible was weighed, readings of which were accurate to 0.1 g.

Each of the deicing salts of Examples 1-4 was diluted with water to yield a water solution with a concentration of 0.2 g/mL 25 mL of the water solution was added into the ceramic crucible. The ceramic crucible was then put in the low-temperature calorstat at the temperature of −10° C. for 30 minutes, thereafter, the liquid in the ceramic crucible was poured out, and the ceramic crucible with remnant ice was quickly weighed.

A sodium chloride deicing salt was tested under the same conditions as above, and a deicing ability ratio of the deicing salt of the invention to the sodium chloride deicing salt was calculated according to the formula: K=(m0−m1)×100/(m01−m11), m0 and the m1 represent the total weight (g) of the ice and ceramic crucible before and after adding the deicing salt of this invention, respectively, and m01 and m11 represent the total weight (g) of the ice and ceramic crucible before and after adding the sodium chloride deicing salt, respectively. Results of the testing are given below in Table 2.

TABLE 2

Deicing ability of deicing salts of the invention

| No. | Example | Deicing ability ratio K (%) |
|---|---|---|
| 1 | 1 | 108 |
| 2 | 2 | 123 |
| 3 | 3 | 121 |
| 4 | 4 | 116 |

As shown in the above table, the deicing ability of the deicing salts of this invention is stronger than that of the sodium chloride deicing salt.

Example 6

Test of Corrosiveness of Deicing Salts of Examples 1-4 on Carbon Steel

According to Chinese national standard GB/T10124-1988, the corrosiveness of the deicing salts of Examples 1-4 on carbon steel has been tested, and the method is summarized as follows:

1) 5 carbon steel sheets with a dimension of 50×25×2 mm$^3$, each having a hole of 3 mm in diameter in the center, were separately immersed in a 5% sulfuric acid solution for 5 minutes, and then washed with water, alcohol, and acetone in turn. After dried with nitrogen, the sheets were put in a dry cabinet, numbered, measured, and weighed;

2) To each of 5 beakers with a capacity of 200 mL, 1,000 mL of purified water was added. 200 g of sodium chloride was then added in one of the beakers, and 200 g of deicing salts of Examples 1-4 of the invention was separately added in the other four beakers;

3) Each carbon steel sheet was hung to one end of a nylon cord, respectively, and the other end of the nylon cord was attached to a glass rod disposed on the edge of the beaker, to make sure the carbon steel sheet be in a center or a lower position of the solution;

4) After being immersed in the solutions for 48 hours, the 5 carbon steel sheets were treated with a 3% chlorhydric acid for another 10 minutes, then taken out with rusts cleaned off with brushes, further washed with water and alcohol in turn, thereafter, dried with nitrogen, put in a dry cabinet, and finally weighed;

5) Assessment of the corrosive effect, and the results are given below in Table 3.

TABLE 3

Results of corrosive effect on carbon steel metal sheets

| No. | Example | Original weight M (g) | Weight after corrosion M$_1$ (g) | Weight loss of corrosion (g) | Corrosion rate R (mm/a) | Corrosion ratio (%) * |
|---|---|---|---|---|---|---|
| 1 | Sodium chloride | 19.1841 | 19.1278 | 0.0563 | 0.4675 | |
| 2 | Example 1 | 19.2939 | 19.2891 | 0.0048 | 0.0399 | 8.53 |
| 3 | Example 2 | 19.6620 | 19.6599 | 0.0021 | 0.0174 | 3.73 |
| 4 | Example 3 | 20.0181 | 20.0154 | 0.0027 | 0.0224 | 4.79 |
| 5 | Example 4 | 19.1117 | 19.1102 | 0.0015 | 0.0125 | 2.66 |

*Corrosion rate (%) is calculated on the premise that the corrosion rate of the sodium chloride is 100%.

Corrosion rate $R=[8760\times(M-M_1)]\div STD\times 10$

In the formula, S represents the area of the testing carbon steel sheet, and the standard value is 28 m$^2$; T represents the time of immersion, the value is 48 hours; D represents the density of the carbon steel sheet, and the value is 7.85 g/cm$^3$; 8760 represents the number of hours in one year; and 10 is a unit conversion coefficient.

As shown in the above table, the corrosive effects on the carbon steel sheets of the deicing salts of this invention are obviously lower than that of sodium chloride.

Example 7

Test of Corrosiveness of Deicing Salts of Examples 1-4 on Concrete

According to the method of ASTM designation C672-84, the corrosiveness of the deicing salts of Examples 1-4 on concrete has been tested, and the testing method is summarized below:

A concrete block with a dimension of 100×100×100 mm³ was first immersed in a 3% deicing salt solution at a freezing temperature of −20° C. for 16 hours, and then defrozen at room temperature for 8 hours. The above freezing and defreezing processes were repeated for 50 days, once per week, and the deicing salt was renewed and the concrete block was weighed. The corrosion rate of concrete was calculated based on the weight loss, and the corrosion ratio was calculated based on comparison to the sodium chloride. Results of the testing are given below in Table 4.

TABLE 4

Corrosive effects of deicing salts of Examples 1-4 on concrete

| No. | Example | Concrete corrosion rate (%) | Corrosion ratio (%) * |
|---|---|---|---|
| 1 | Sodium chloride | 4.98 | |
| 2 | Example 1 | 0.30 | 6.02 |
| 3 | Example 2 | 0.23 | 4.62 |
| 4 | Example 3 | 0.17 | 3.41 |
| 5 | Example 4 | 0.14 | 2.81 |

* Corrosion ratio (%) is calculated on the premise that the corrosion rate of sodium chloride is 100%.

*Corrosion ratio (%) is calculated on the premise that the corrosion rate of sodium chloride is 100%.

As shown in the above table, the corrosive effect of the deicing salt of this invention on concrete is prominently lower than that of the sodium chloride.

Example 8

Test of Biodegradation Ability and Appearance of Deicing Salts of Examples 1-4

According to APAH standard methods for examination of water and waste water, the biodegradation ability of deicing salts of Examples 1-4 has been tested. The testing method is summarized below.

The deicing salt was diluted with water to yield a 15% water solution, and then incubated at a constant temperature of 20° C. for 15 days. Testing results are given below in Table 5:

TABLE 5

Results of biodegradation ability of deicing salts

| Sample | Odor | 15 days' BOD (O₂/kg of sample) | 15 days' COD (O₂/kg of sample) | Biodegradation ratio after 15 days (%) |
|---|---|---|---|---|
| Example 1 | Odorless | 0.22 | 0.28 | 92 |
| Example 2 | Odorless | 0.20 | 0.32 | 95 |
| Example 3 | Odorless | 0.09 | 0.19 | 90 |
| Example 4 | Odorless | 0.25 | 0.27 | 91 |
| Sodium acetate deicing salt | Slightly acidic | 0.54 | 0.86 | 58 |
| Urea deicing salt | | 3.44 | 2.95 | 34 |

As shown in the above table, compared with the sodium acetate deicing salt or the urea deicing salt, the deicing salt of the invention is easier to be biodegraded, and the BOD and the COD of the deicing salt of the invention are both lower than those of the sodium acetate deicing salt or the urea deicing salt, thus the deicing salt of the invention has a better performance of environmental protection.

Example 9

Total Immersion Corrosion Test

According to the standard practice for total immersion corrosion test of ASTMF 483 in SAE AMS 1431C-Compound, Solid Deicing/Anti-Icing Runways and Taxiways, total immersion corrosion test of Examples 1-4 of the invention has been carried out:

The standard practice of ASTMF 483 comprises steps of below: a metal sheet in a dimension of 50.8×25.4×1.6 mm³ was totally immersed in a 15% deicing salt solution at a constant temperature of 38±3° C. under one standard atmospheric pressure for 24 hours, during which weight change and color change of the corrosion appearance were recorded. The unit of the weight change before and after the immersion is mg/cm²·24 hours.

Results of the total immersion corrosion test on the metal sheet are given below in Table 6:

TABLE 6

Results of the total immersion corrosion test on metal sheet

| Specifications of metal sheets | Allowable value of the standard (weight change and appearance) | Weight change (mg/cm² · 24 hours) and appearance change | | | |
|---|---|---|---|---|---|
| | | Example 1 | Example 2 | Example 3 | Example 4 |
| Aluminum alloy of AMS 4037 treated with the method of AMS 2470 | ≤0.3 no visible corrosion (such as discoloration, etching spots, and imprints) | 0.06 no discoloration | 0.01 no discoloration | 0.005 no discoloration | 0.005 no discoloration |
| Aluminum alloy of AMS 4041 | ≤0.3 no visible corrosion (such as discoloration, etching spots, and imprints) | 0.06 no discoloration | 0.04 no discoloration | 0.010 no discoloration | 0.005 no discoloration |
| Aluminum alloy of AMS 4049 | ≤0.3 no visible corrosion (such as discoloration, etching spots, and imprints) | 0.09 no discoloration | 0.006 no discoloration | 0.008 no discoloration | 0.001 no discoloration |
| Magnesium alloy of AMS 4376 treated with the dichromate method of AMS 2475 | ≤0.2 no visible corrosion (such as discoloration, etching spots, and imprints) | 0.08 no discoloration | 0.070 no discoloration | 0.001 no discoloration | 0.0006 no discoloration |

As shown in the above table, the corrosion test of magaluma, aluminum, and other light metal materials indicates that the deicing salt of the invention has meet the standard of total immersion corrosion test of SAE AMS 1431C.

The above examples have exemplified components and their weight percents of four deicing salts. To further illustrate the invention, examples of the deicing salt are provided hereinbelow.

Example 10

A deicing salt comprises 95 wt. % of a formate, 3.5 wt. % of a sodium disilicate, 0.5 wt. % of sodium metaaluminate, 0.5 wt. % of sodium carbonate, and 0.5 wt. % of PBTCANa₄.

The modulus of the silicate is 1.

The method for preparing the deicing method is as follows:

each component was collected by weight percent, ground, mixed, and stirred uniformly, then the resulting mixture was squeezed into particles between 2 and 6 mm in diameter, and finally oven-dried to yield the deicing salt.

Example 11

A deicing salt comprises 97.9 wt. % of a formate, 1 wt. % of a sodium disilicate, 0.05 wt. % of sodium metaaluminate, 1 wt. % of sodium carbonate, and 0.05 wt. % of HPAANa.

The modulus of the silicate is 3.5.

The method for preparing the deicing salt is the same as that in Example 10.

Example 12

A deicing salt comprises 96.35 wt. % of a formate, 3 wt. % of a sodium disilicate, 0.05 wt. % of sodium metaaluminate, 0.1 wt. % of sodium carbonate, and 0.5 wt. % of HPAANa.

The modulus of the silicate is 2.

The use dosage of the deicing salt of the invention can be referred to Table 7 hereinbelow:

TABLE 7

Usage amount of deicing salt of the invention

| Atmospheric temperature | Usage amount for prevention (g/m$^2$) | Usage amount for deicing (g/m$^2$) |
| --- | --- | --- |
| 0--−5° C. | 30 | 50 |
| −5--−10° C. | 50 | 80 |
| −10--−15° C. | 80 | 120 |

The deicing salt of the invention is mainly used to remove and prevent the accumulation of frost, ice, and snow, in airport runways or in streets, roads, bicycle routes, sidewalks, bridges, courtyards, parking lots, playgrounds, and other traffic areas.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A deicing salt composition, comprising:
   a) between 95 and 98 wt. % of a formate;
   b) between 1 and 3.5 wt. % of a silicate;
   c) between 0.05 and 0.5 wt. % of sodium metaaluminate;
   d) between 0.1 and 1 wt. % of sodium carbonate; and
   e) between 0.05 and 0.5 wt. % of a organophosphate containing a phosphoryl group;

wherein said formate is selected from the group consisting of sodium formate, potassium formate, and a mixture thereof;

said silicate is selected from the group consisting of sodium disilicate, potassium disilicate, sodium metasilicate, potassium metasilicate, and a mixture thereof; and said organophosphate containing said phosphoryl group is selected from the group consisting of hydroxy ethyl disodium diphosphate, 2-phosphate butane-1, 2,4-tricarboxylic acid tetrasodium, α-hydroxy-phosphorus sodium acetate, and a mixture thereof.

2. The deicing salt composition of claim 1, wherein a modulus of said silicate is between 1 and 3.5.

3. A method of preparation of the deicing salt composition of claim 1, the method comprising: grinding, mixing, stirring, and squeezing said formate, said silicate, said sodium metaaluminate, said sodium carbonate, and said organophosphate containing said phosphoryl group, to yield particles with diameters of between 2 and 6 mm, and drying the particles.

4. The method of claim 3, wherein a modulus of said silicate is between 1 and 3.5.

* * * * *